United States Patent [19]

Kendall et al.

[11] 4,304,826
[45] Dec. 8, 1981

[54] APPARATUS AND METHOD FOR BLOW MOLDING MOTIVE POWER BATTERY CASES

[75] Inventors: Donald S. Kendall; Arthur F. Moody, both of Arlington; Laurence J. Britton, Bennington, all of Vt.

[73] Assignee: Mack Molding Company, Inc., Arlington, Vt.

[21] Appl. No.: 119,105

[22] Filed: Feb. 6, 1980

[51] Int. Cl.³ .............................................. H01M 2/02
[52] U.S. Cl. .................................. 429/176; 264/526; 264/541
[58] Field of Search ................ 429/176, 163; 264/526, 264/541, DIG. 33

[56] References Cited

U.S. PATENT DOCUMENTS

| | | | |
|---|---|---|---|
| 1,513,037 | 10/1924 | Douglas | 429/176 X |
| 1,538,031 | 5/1925 | Dunzweiler | 429/176 |
| 2,750,625 | 6/1956 | Colombo | 429/539 X |
| 3,388,007 | 6/1968 | Fiandt | 429/176 X |
| 3,754,851 | 8/1973 | Reilly et al. | 264/541 X |
| 3,856,175 | 12/1974 | Dunlop | 429/176 X |
| 4,218,416 | 8/1980 | Gokcen | 264/541 X |

FOREIGN PATENT DOCUMENTS

| | | | |
|---|---|---|---|
| 571435 | 8/1945 | United Kingdom | 429/176 |
| 1010527 | 11/1965 | United Kingdom | 429/176 |

*Primary Examiner*—Anthony Skapars
*Attorney, Agent, or Firm*—Heslin & Watts

[57] ABSTRACT

A motive power battery casing is blow molded in an oblong configuration of rectangular cross-section. The die is notched so as to create longitudinal ribs of relatively greater thickness of the molding material in a generally cylindrical parison. The casing mold is vented in the bottom at its corners to assure full development of the casing corners. The casing is formed with relatively thin side walls and a relatively thicker collar of the molding material near its top in order to provide sufficient strength for heat sealing at the top.

10 Claims, 5 Drawing Figures

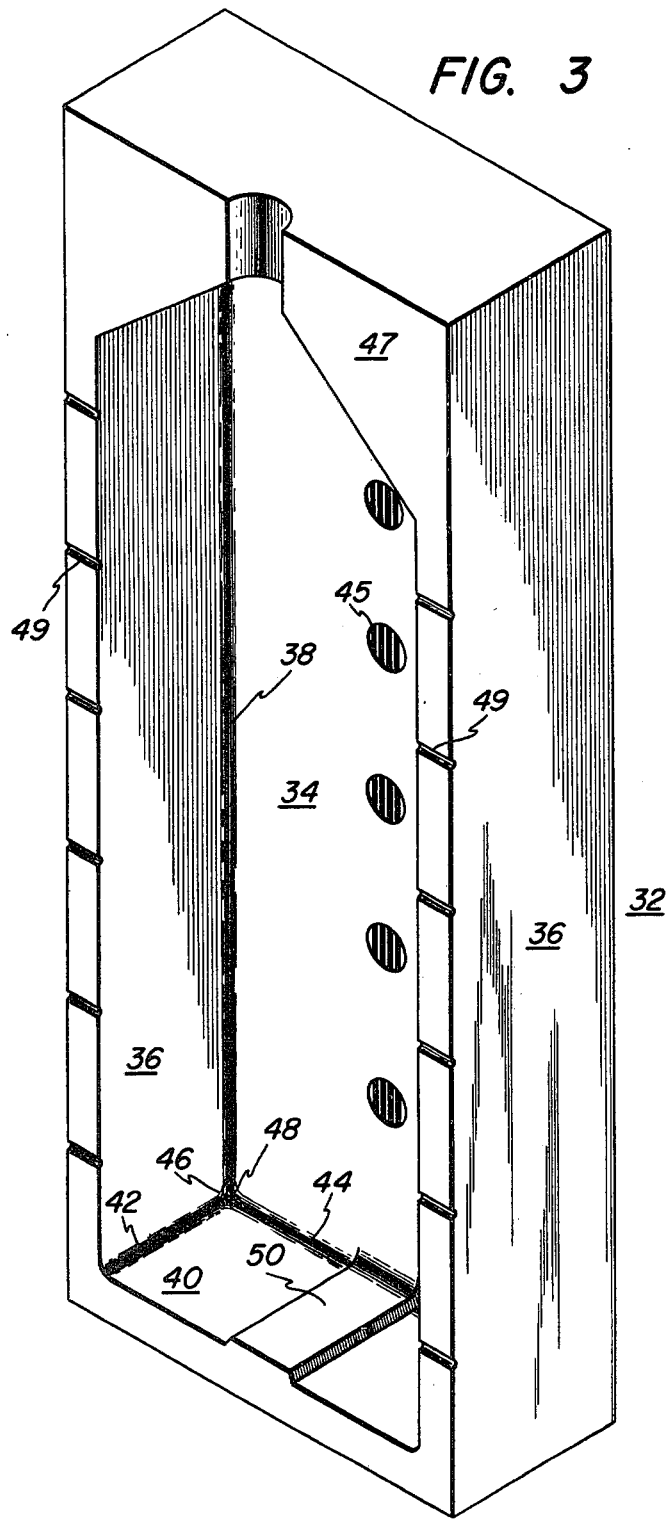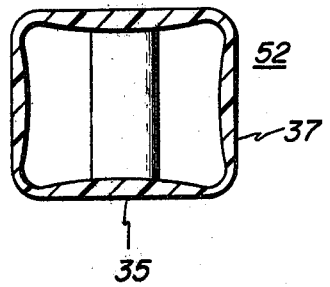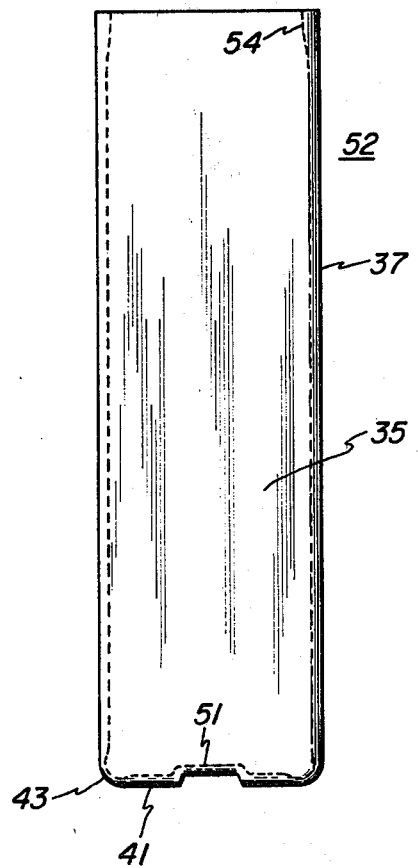

APPARATUS AND METHOD FOR BLOW MOLDING MOTIVE POWER BATTERY CASES

BACKGROUND AND SUMMARY OF THE INVENTION

This invention relates to motive power battery casings and the use of blow molding procedures in their fabrication.

Motive power battery cases of the type described hereinafter tend to be fairly long (about 30 inches) and rectangular in cross-section (about 5×6 inches). For many applications, a plurality of motive power batteries are grouped together in order to provide sufficient electrical power and capacity. It is, therefore, important that reasonable dimensional tolerances are maintained as to outside dimensions and inside dimensions so that the grouping of batteries will be reasonably compact, so that the plates may be properly fit within the casings and so that the casings can be properly heat sealed at their tops. Furthermore, battery cases must be sufficiently tough and impact resistant since they are often used in moving vehicles where they might well be subjected to severe jostling and impact with one another and with the housing containing them.

Conventional practice has been to prepare motive power battery cases through the use of injection or rotational molding. These procedures permit tolerances to be maintained with a relatively high degree of accuracy. Blow molding, however, has not been used primarily because it has not been possible to maintain reasonably accurate tolerances with this process. As a result, blow molding techniques have been used primarily in applications where tolerances are not particularly important and those skilled in the art would not expect the blow molding process to be satisfactory for the purpose of preparing motive power battery cases. This has been unfortunate because there are several advantages associated with blow molding as compared with injection or rotational molding. For one thing, it is possible to use materials in the blow molding process which are much tougher. This would permit the thickness and hence the weight of the battery casings to be lighter and more suitable for transportation applications. Secondly, blow molding is a much less costly process than injection or rotational molding. Furthermore, blow molding is a low stress process while the other processes are relatively high stress in nature. Because of this and because of the differences in the materials used in the two processes, the products made in each exhibit dramatic difference in their resistance to stress cracking, the blow molded product being far superior in this regard. Finally, the blow molding process offers a much higher production rate.

The primary obstacle to the use of blow molding in the production of motive power battery cases relates to the rectangular shape which is optimal for this application. The parison formed in the blow molding process has a generally cylindrical shape and when it is blown into a rectangular shape, the corners of the product will be relatively thin and weak. As a result, it is necessary to either make the entire product overly thick or to find a way in which to avoid undue thinness in the corners and joints where the wall sections meet.

It is an object of this invention to produce a battery casing of great toughness and within close tolerances through the use of a blow molding process.

It is a further object of this invention to produce a battery casing having relatively thinner walls than has heretofore been possible in order to produce a relatively lightweight casing at low cost.

Briefly described, the invention is carried out by making extrusion notches in a die in order to produce a parison having longitudinal ribs of greater thickness than the walls of the parison in general. The parison is aligned so that these ribs will ultimately become the corners and joints where the walls and bottom meet so as to maintain sufficient thickness in these areas. The mold used is provided with a unique venting arrangement to assure the full and complete formation of the rectangularly shaped casing.

Also briefly described, the battery casing produced as a part of this invention is a blow molded rectangularly shaped container having minimum wall joint thickness of 0.025 inches while maintaining maximum overall wall thickness of 0.140 inches. A collar section for heat sealing is provided having wall joint thickness of at least 0.070 inches and overall wall thickness not exceeding 0.140 inches. Similarly, the bottom joints and the corners of the container have a minimum thickness of 0.025 inches.

BRIEF DESCRIPTION OF DRAWINGS

FIG. 3 is an isometric view of one of the halves of the mold of the invention.

FIG. 4a is an elevation of a battery case formed in accordance with the invention.

FIG. 4b is a top plan view of the invention.

Referring now to FIG. 1, there is shown a die 10 and mandrel 12 in cross-section. Centrally located near the top of the die is an inlet 14 which passes through the die to an outlet 16 at its bottom. The channel between the inlet 14 and outlet 16 is comprised of a cylindrical portion 18 and a conical portion 20. As indicated in FIG. 1, the cone angle is preferably 20°, although a range of 19° to 21° is satisfactory.

Figure 1:
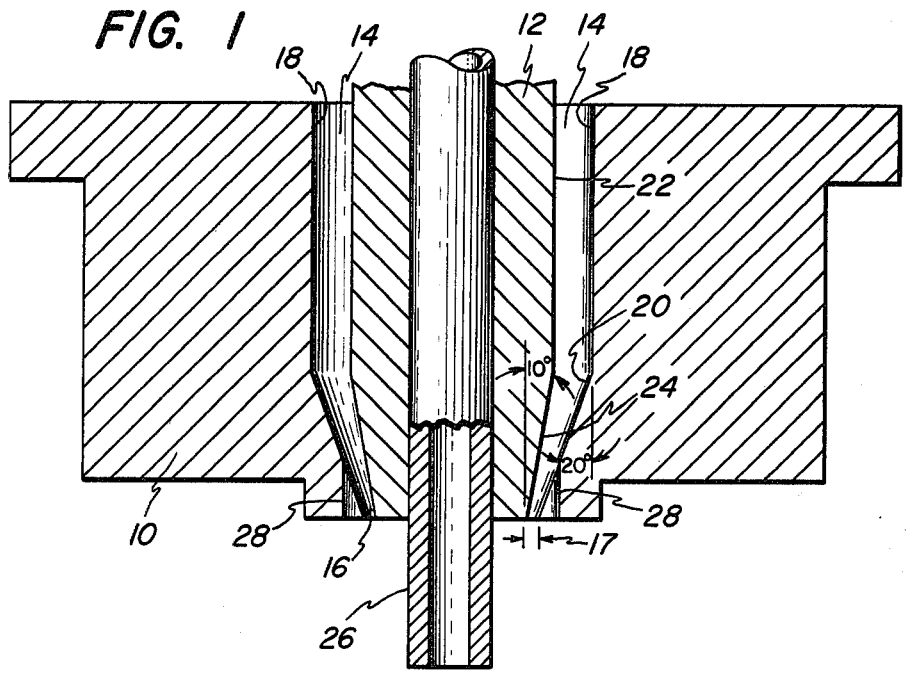
FIG. 1 is a central cross-sectional view of the die and mandrel of the invention, the section passing through line 1—1 of FIG. 2.

Similarly, mandrel 12 has a cylindrical portion 22 and a conical portion 24. The cone angle of the cone portion of the mandrel is preferably 10°, as indicated in FIG. 1, with a range of 9° to 11° being satisfactory.

The cone portions of die 10 and mandrel 12 are truncated and they are in general alignment across their truncation planes. The mandrel is generally smaller in diameter than the opening through die 10, thereby leaving a space through which the material to be molded may pass. However, the die 10 and mandrel 12 are preferably movable axially with respect to one another. This capability renders the die opening at outlet 16 "programmable," a term well-known to those skilled in the art of blow molding. By the relative movement of the parts causing mandrel 12 to be more or less deeply inserted in die 10, one would thereby respectively restrict or enlarge the gap 17 between itself and die 10 at outlet 16. It will be therefore understood that die 10 and mandrel 12 are connected to a blow molding machine and, more particularly, one having the capability of controlling or programming the relative movement between these two parts.

Also shown in FIG. 1 protruding from mandrel 12 is a blow pin 26 which is assumed to be connected to a suitable source of pressurized gas.

Figure 2:
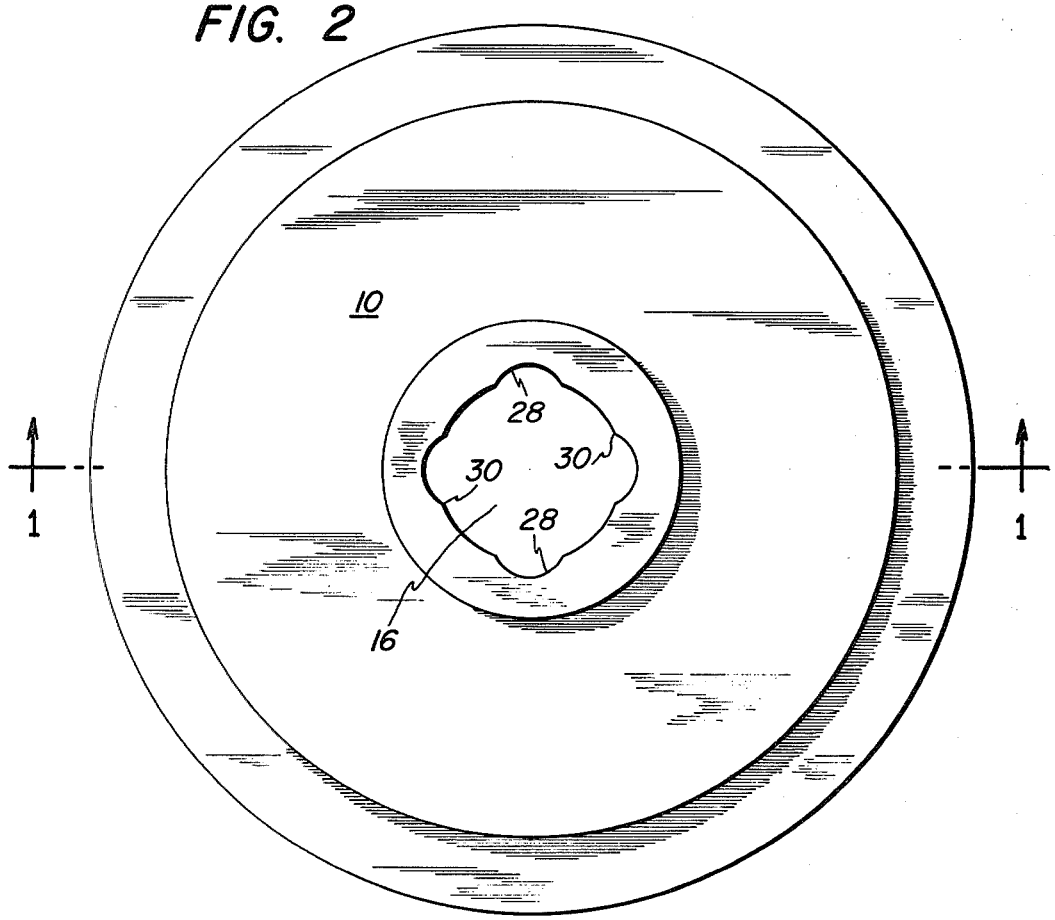
FIG. 2 is a bottom plan view of the die of FIG. 1 with the mandrel removed.

At the bottom of die 10 at outlet 16, four extrusion notches 28 are shown in FIG. 2. These have the effect of widening the die gap at the indicated locations. For the purpose of blow molding motive power battery cases of the type herein described, the die gap elsewhere would vary through a programmed range of 0.020 inches and 0.080 inches. The increased width of the die gap at the extrusion notches 28 is 0.040 inches at its maximum and, as shown in FIG. 2, the notch tapers from its point of maximum depth to cusp points 30 on either side where the general gap thickness is resumed. The general diameter of outlet 16 is about 2.675 inches. The notches are formed by using a cutter having a diameter of about 1.25 inches and cutting into the edges of outlet 16 to a maximum depth of 0.040 inches.

FIG. 3 shows one half of the mold 32 used in accordance with this invention. The mold has substantially flat or planar walls 34 and 36 which meet in arcuate wall joints 38. Wall joints 38 are preferably formed with a radius of 0.25 inches. Bottom 40 meets the walls in bottom joints 42 and 44. These too are arcuate and preferably formed with a radius of 0.50 inches. Curved corners 46 are formed at the intersection of the wall joints 38 and bottom joints 42 and 44. In each corner 46, it will be observed that there is a corner vent opening 48. This vent communicates with the atmosphere exterior to the mold. Its diameter is approximately 0.030 inches. Also, parting line vents 49 appear in the parting surface 47. Each vent 49 is a groove milled into parting surface 47 having a width of about 0.5 inches and a depth of about 0.010 inches extending from the exterior surface to the interior surface of the mold. Wall vents 45 appear in wall 34.

Located in the bottom of mold 32 is a raised portion 50.

FIGS. 4a and 4b show the battery casing 52 of this invention. In FIG. 4a, it will be observed that the thickness near the top of the casing is greater. There is a collar 54 having a minimum thickness at the wall joints of 0.070 inches and a maximum thickness of 0.140 inches along the walls 35 and 37. Below collar section 34, walls 35 and 37 are seen in FIG. 4a to be thinner. However, their cross-sectional shape would resemble that shown in FIG. 4b. In other words, each wall is thicker along its mid-portion than it is near the joints where it meets the other walls. Below collar 54, the thickness of the wall joints is at least 0.025 inches while the walls are of a maximum thickness of 0.140 inches. The outside radius of the wall joints is about 0.25 inches.

Bottom 41 meets the walls at bottom joints 43. Each joint 43 has an outside radius of about 0.50 inches and a thickness of at least 0.025 inches. The remaining portions of the bottom 41 would have a greater thickness. Raised portion 51 gives the casing stability when standing on its end, as shown in FIG. 4a. The height of raised portion 51 over the general level of bottom 41 is about 0.060 inches. It is particularly helpful for preventing the casing from rocking on its bottom as battery plates are lowered into casing 52.

In carrying out the process of this invention, the material to be molded may be polypropylene and very satisfactory results have been obtained using material sold under the trademark, Amoco "60-11." The molding material is first heated to a molten state within the molding machine and forced through the inlet 14 of FIG. 1 in a conventional manner such as by using a hydraulic ram. The molding material flows around mandrel 12 and is discharged through die gap 17 to form a parison. For the present invention, a parison having an overall length of approximately 35 inches is formed with an overall cylindrical shape in a drop time of approximately two seconds. The thickness of the parison becomes about twice the size of the die gap 17 due to swelling of the molding material. A rib of extra thick molding material is formed along the parison due to the presence of extrusion notches 28. The temperature of the molding material is maintained within a range from 360° to 440° F., with 400° being optimal. This is accomplished through the use of conventional band heaters (not shown) on die 10.

Once the parison is fully formed, the halves of a mold are brought together around it in any conventional way. Next, a gas, which may be air, is introduced through the blow pin 26 at a pressure of approximately 80 psi in order to force the parison against the insides of the mold, thereby shaping the casing 52. The corners 43 and walls 35 and 37 of the casing are fully developed and formed due to the presence of the venting arrangements described above.

The battery casing produced using the above described apparatus and procedure will be within the tolerances mentioned and has been found to be very satisfactory for use as a motive power battery casing. What the inventors claim as their invention is defined by the following claims.

We claim:

1. A process for molding a battery casing having relatively planar walls joined to one another in arcuate joints comprising the steps of:
   forming a parison with a longitudinal rib of relatively greater thickness than the rest of the parison correspondingly positionally to each proposed joint;
   aligning the parison in a mold having relatively planar inside surfaces connected to one another in arcuate joints so that each rib corresponds positionally with a mold joint; and
   introducing gas under pressure to the interior of the parison so as to force it to expand until it reaches the surfaces of the mold.

2. The process of claim 1 further comprising the step of heating the parison to a temperature above 360° F. and below 440° F., said step to be performed prior to the gas introduction step.

3. The process of claim 1 in which the battery to be molded is to have a bottom connected to the sides in arcuate joints, the bottom joints meeting the wall joints in curved corner joints comprising the additional step of venting the mold at locations corresponding to the corner joints.

4. A motive power battery case comprised of:
   a bottom;
   four upstanding walls attached to the bottom and to each other in arcuate joints in the overall form of an oblong container of substantially rectangular cross-section having an open end, the joints having a minimum thickness of 0.025 inches and the walls having a maximum of 0.140 inches; and
   a collar section at the open end of the container formed as a continuation of the walls and the joints between the walls, said collar section having joint thickness of at least 0.070 inches and wall thickness of a maximum of 0.140 inches;

said battery case having been made by the process comprised of the following steps:

forming a parison with a longitudinal rib of relatively greater thickness than the rest of the parison corresponding positionally to each proposed joint;

aligning the parison in a mold having relatively planar inside surfaces connected to one another in arcuate joints so that each rib corresponds positionally with a mold joint; and introducing gas under pressure to the interior of the parison so as to force it to expand until it reaches the surfaces of the mold.

5. The invention of claim 4 wherein the process further comprises the step of heating the parison to a temperature above 360° F. and below 440° F., said step to be performed prior to the gas introduction step.

6. The invention of claim 5 in which the battery case has curved corner joints at its bottom end and the process comprises the additional step of venting the mold at locations corresponding to the corner joints.

7. The product made in accordance with the process of claim 1, 2 or 3.

8. The invention of claim 4 wherein the bottom has a raised portion molded in it for standing stability.

9. The invention of claim 8 wherein the process further comprises the steps of heating the parison to a temperature above 360° F. and below 440° F., said step to be performed prior to the gas introduction step.

10. The invention of claim 4, 8 or 9 wherein the battery case has curved corner joints at its bottom end and the process comprises the additional step of venting the mold at locations corresponding to the corner joints.

* * * * *